(12) United States Patent  
Tanaka (10) Patent No.: US 7,046,469 B2  
(45) Date of Patent: May 16, 2006

(54) HARD DISK DRIVE

(75) Inventor: Hideaki Tanaka, Odawara (JP)

(73) Assignee: Hitachi Global Storage Technologies, Ltd., Odawara (JP)

( * ) Notice: Subject to any disclaimer, the term of this patent is extended or adjusted under 35 U.S.C. 154(b) by 647 days.

(21) Appl. No.: 10/075,243

(22) Filed: Feb. 15, 2002

(65) Prior Publication Data

US 2002/0149871 A1    Oct. 17, 2002

(30) Foreign Application Priority Data

Apr. 11, 2001    (JP)    ............................... 2001-112371

(51) Int. Cl.
*G11B 15/18*    (2006.01)
(52) U.S. Cl. ..................... 360/69; 360/97.02
(58) Field of Classification Search ................. 360/69, 360/97.02, 97.03, 97.04
See application file for complete search history.

(56) References Cited

U.S. PATENT DOCUMENTS

| | | | | |
|---|---|---|---|---|
| 3,573,771 A * | 4/1971 | Cockrell, Jr. | ............ | 360/97.04 |
| 4,389,687 A * | 6/1983 | Gorove | ............ | 360/98.03 |
| 6,578,816 B1 * | 6/2003 | Lille | ............ | 251/11 |
| 6,735,044 B1 * | 5/2004 | Tomioka | ............ | 360/97.02 |
| 6,831,811 B1 * | 12/2004 | Andrikowich et al. | ... | 360/97.02 |
| 2002/0012279 A1 * | 1/2002 | Angelo et al. | ............ | 365/200 |

FOREIGN PATENT DOCUMENTS

| JP | 51-6707 | 7/1974 |
|---|---|---|
| JP | 58-062879 | 4/1983 |
| JP | 59-022274 | 2/1984 |
| JP | 64-062890 | 3/1989 |
| JP | 04-299092 | 10/1992 |
| JP | 05-012848 | 1/1993 |
| JP | 05-314751 | 11/1993 |
| JP | 07-287976 | 10/1995 |

OTHER PUBLICATIONS

Japanese Office Action dated Jun. 24, 2005, in connection with corresponding Japanese Patent Application No. 2001-112371.

* cited by examiner

*Primary Examiner*—K. Wong
(74) *Attorney, Agent, or Firm*—Antonelli, Terry, Stout and Kraus, LLP.

(57) ABSTRACT

A hard disk drive is disclosed which is highly reliable against environmental changes. A breather hole is formed in an enclosure which houses therein a magnetic disk and a magnetic head. An opening/closing control mechanism is provided in the breather hole. The opening/closing control mechanism is made up of a valve member for opening and closing the breather hole, a lever which supports the valve member at a fulcrum, a spring which urges the valve member in a closing direction through the lever, and a solenoid which causes the valve member to be displaced in an opening direction against the biasing force of the spring. When the hard disk drive is not operating, the breather hole formed in the enclosure 1 is closed to seal the enclosure hermetically. The breather hole is opened only in an operating condition of the hard disk drive in which the internal temperature of the enclosure rises, thereby minimizing an environmental deterioration in the interior of the enclosure caused by moisture, gases and particles entering from the exterior and preventing a lowering of reliability caused by corrosion of the magnetic disk and the magnetic head.

13 Claims, 6 Drawing Sheets

FIG. 1

FIG. 2(a)
HARD DISK DRIVE OFF

FIG. 2(b)
HARD DISK DRIVE ON

FIG. 3(a)

HARD DISK DRIVE OFF

FIG. 3(b)

HARD DISK DRIVE ON

FIG. 4(a)

HARD DISK DRIVE OFF

FIG. 4(b)

HARD DISK DRIVE ON

HARD DISK DRIVE

BACKGROUND OF THE INVENTION

The present invention relates to a hard disk drive, particularly a hard disk drive for use as a storage unit in an information processor or the like. More particularly, the present invention is concerned with a hard disk drive having an enhanced reliability against environmental changes.

A hard disk drive mainly comprises a magnetic disk serving as a storage medium and a magnetic head for read and write. It further comprises a rotating mechanism for the magnetic disk and a positioning mechanism for the magnetic head. These components are disposed within an enclosure. A hard disk drive is connected to a personal computer or another information device and is used as a main memory, for which a high reliability is required.

Particularly, in the case where a hard disk drive is mounted on a mobile personal computer, it is exposed to various external environments. Therefore, it is important that the reliability of the hard disk drive should not be deteriorated against environmental changes. Typical examples of such environmental changes include a change in temperature, a change in atmospheric pressure, a change in humidity, and whether a trace of contamination component is present or not.

As to the contamination component, typical examples are corrosive gases which are deposited as contamination on the surfaces of the magnetic head and the magnetic disk, causing corrosion and trouble of the head and the disk, such as various organic gases and organometallic gases, as well as particles which get into the gap between the magnetic disk and the magnetic head, causing damage. For preventing a bad influence of these components, the enclosure of the hard disk drive has a semi-sealed structure usually through a very small vent hole called a breather hole. In the interior part (inside) of the enclosure are disposed an adsorbent for adsorbing harmful gas components and a filter unit for removing particles, whereby the harmful contamination component is removed to keep the inside of the hard disk drive clean and prevent the deterioration of reliability caused by the contamination component.

In JP-A No. H7-287976 there is disclosed a hard disk drive wherein a filter unit having an expansion chamber serving as a buffer is disposed outside a breather hole, allowing corrosive gases invaded from the exterior to stay in the expansion chamber, thereby further suppressing the entry of contamination component from the exterior part (outside) to the inside of the enclosure.

Since the concentration of the contamination component is usually very low, it can be fully suppressed by the above structure. With the above enclosure, however, it is difficult to ensure a high reliability against a change in external humidity. In the interior of the enclosure is provided a water adsorbent for adsorbing water, whereby the inside of the enclosure is normally held at a low humidity. But a high humidity environment must be taken into consideration as an external environment of the hard disk drive and in this case a gradual entry of external high-concentration water into the enclosure is unavoidable. Particularly, when the hard disk drive is left standing for a long period under a high humidity environment, it is impossible to remove water completely with a limited amount of the water adsorbent. Upon saturation of the water adsorbent the humidity in the interior part of the enclosure becomes almost equal to the environmental humidity. If the hard disk drive is further left standing in this state, corrosion of the magnetic head and the magnetic disk is accelerated. This is a great cause of loss in reliability of the hard disk drive.

In JP-A No. H5-12848 there is disclosed a hard disk drive wherein a heater is provided within a water adsorbent unit communicating with both inside and outside of an enclosure, and at the time of regenerating the water adsorbent periodically by the heater, breather holes for breathing from the water adsorbent unit to the inside and outside of the enclosure are controlled for opening and closing with use of a shape memory alloy which is deformed with heat of the heater. In this conventional hard disk drive, when the breather hole from the water adsorbent unit to the outside of the enclosure is closed, there is provided a hermetically sealed structure wherein the interior of the enclosure and the water adsorbent unit are connected together. When heating is performed with the heater at the time of regenerating the water adsorbent, the breather hole to the outside of the enclosure is opened, while the breather hole to the inside of the enclosure is closed, so that only the enclosure is hermetically sealed and water released from the water adsorbent is discharged to the outside of the enclosure, whereby, according to this prior art publication, the inside of the enclosure is always maintained at a low humidity, the accumulation of water in the interior part of the enclosure is prevented, and corrosion resistance is improved. In this conventional hard disk drive, however, since the enclosure is always sealed hermetically, there is a technical problem such that the occurrence of a pressure difference between the inside and the outside of the enclosure is unavoidable due to a change in external temperature or in external atmospheric pressure.

From the standpoint of preventing the entry of harmful components into the enclosure it is desirable that the hard disk drive have a completely sealed structure. However, in the case of a completely sealed structure, a pressure difference between the inside and the outside of the enclosure occurs due to a change in external temperature or in external atmospheric pressure, with consequent likelihood of a change in floating quantity of the magnetic head due to deformations of the enclosure and peripheral mechanical parts or the occurrence of data error due to a worsening in positioning accuracy of the magnetic head.

In JP-A No. H5-314751 there is disclosed a hard disk drive wherein, as an enclosure sealing structure, a pressure regulating mechanism is provided, such as connecting the inside and the outside of an enclosure through a movable cylinder or disposing an elastic structure in part of the sealing structure, to prevent the occurrence of a pressure difference between the inside and the outside of the enclosure caused by a change in external temperature or pressure. However, the hard disk drive is usually required to tolerate an external temperature change from about −5° C. to about +60° C. and an external atmospheric pressure change of about 3,000 m altitude (about 0.7 atm.). For maintaining both internal and external pressures of the enclosure constant even under these conditions, it is necessary for the pressure regulating mechanism to be able to absorb a volumetric change of ±30% or more, so that the mechanism itself becomes very large in size. Therefore, the application thereof to a small-sized hard disk drive is difficult.

SUMMARY OF THE INVENTION

As noted above, the prior art is unsatisfactory for ensuring reliability of the hard disk drive against possible environmental changes such as changes in temperature, atmospheric pressure and humidity, as well as the presence of contamination.

The present invention can provide a hard disk drive capable of retaining a high reliability even when left standing over a long period under an environmental change such as a change in temperature or atmospheric pressure or under a high humidity.

In one aspect of the present invention there is provided a hard disk drive having an enclosure and a breather hole formed between the inside and the outside of the enclosure, the enclosure capable of being sealed hermetically and in which is accommodated at least a magnetic disk, the hard disk drive being provided with an opening/closing controller which controls opening and closing of the breather hole in accordance with an operating condition of the hard disk drive.

In another aspect of the present invention there is provided a hard disk drive having an enclosure and a breather hole formed between the inside and the outside of the enclosure, the enclosure capable of being sealed hermetically and in which is accommodated at least a magnetic disk, the hard disk being provided with an opening/closing controller which controls opening and closing of the breather hole, wherein when the hard disk drive is OFF, the breather hole is closed to put the inside of the enclosure in a hermetically sealed state, while when the hard disk drive is in operation, the breather hole is opened to ensure the passing of air between the inside and the exterior of the enclosure through the breather hole.

In a further aspect of the present invention there is provided a hard disk drive having an enclosure and a breather hole formed between the inside and the outside of the enclosure, the enclosure capable of being sealed hermetically and in which is accommodated at least a magnetic disk, the hard disk drive being provided with an opening/closing controller controls the opening and closing of the breather hole, wherein when a rotating mechanism for the magnetic disk is not in operation, the breather hole is closed to put the inside of the enclosure in a hermetically sealed state, while when the rotating mechanism is in operation, the breather hole is opened to ensure the passing of air between the inside and the outside of the enclosure through the breather hole.

In a still further aspect of the present invention there is provided a hard disk drive having an enclosure and a breather hole formed between the inside and the outside of the enclosure, the enclosure capable of being sealed hermetically and in which is accommodated at least a magnetic disk, the hard disk drive being provided with a closure which closes the breather hole and which, when a difference in pressure between the inside and the outside of the enclosure has reached a predetermined value or more, opens the breather hole.

BRIEF DESCRIPTION OF THE DRAWINGS

FIGS. 2(*a*) and 2(*b*) are schematic diagrams showing an example of construction and operation of a mechanism controlling opening and closing of a breather hole;

FIGS. 3(*a*) and 3(*b*) are schematic diagrams showing a modified example of construction and operation of a mechanism controlling opening and closing of a breather hole;

FIGS. 4(*a*) and 4(*b*) are schematic diagrams showing a further modified example of construction and operation of a mechanism for controlling opening and closing of a breather hole;

DESCRIPTION OF THE PREFERRED EMBODIMENTS

An embodiment of the present invention will be described in detail hereinunder with reference to the accompanying drawings.

Figure 1:
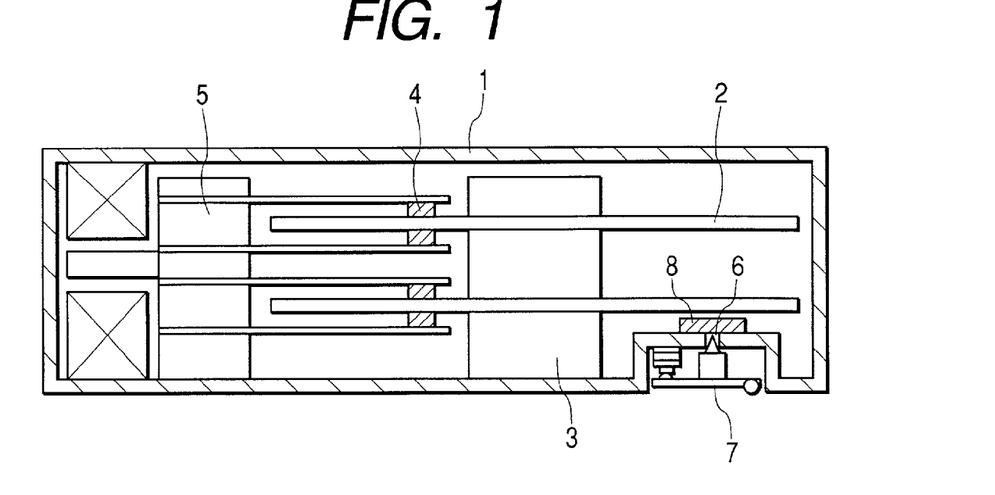
FIG. 1 is a sectional view showing an embodiment of the present invention.

FIG. 1 is a sectional view showing an example of construction of a hard disk drive according to an embodiment of the present invention. In the same figure, the reference numeral 1 denotes an enclosure of the hard disk drive, numeral 2 denotes a magnetic disk which is an information recording medium, numeral 3 denotes a rotating mechanism for the magnetic disk 2, numeral 4 denotes a magnetic head for read and write of information with respect to the magnetic disk 2, numeral 5 denotes a positioning mechanism for positioning the magnetic head 4 on the magnetic disk 2, numeral 6 denotes a breather hole formed in the enclosure 1, numeral 7 denotes an opening/closing control mechanism which controls opening and closing of the breather hole 6, and numeral 8 denotes a filter unit affixed to the breather hole 6.

In this embodiment, as will be described later in more detail, opening and closing of the breather hole 6 are controlled by the opening/closing control mechanism in accordance with an operating condition of the hard disk drive, thereby enhancing the reliability against environmental changes. It is a significant technical problem that, when the enclosure 1 is hermetically sealed, there occurs a difference in pressure between the inside and the outside of the enclosure due to a change in external temperature or in atmospheric pressure. However, the technical problem caused by the pressure difference is more influential when the hard disk drive is in operation, such as a change in floating quantity of the magnetic head 4 and a lowering in accuracy of the magnetic head positioning mechanism 5 caused by a deformation of a mechanical component, and is less influential when the hard disk drive is not in operation.

In this embodiment, therefore, the breather hole 6 is opened when the hard disk drive is in operation, to ensure the passing of air through the inside and outside of the enclosure 1, thereby preventing the occurrence of a pressure difference between the inside and the outside of the enclosure, while when the hard disk drive is not in operation, the breather hole 6 is closed to bring the enclosure 1 into a hermetically sealed state, thereby preventing the entry of moisture and particles to the interior part of the enclosure from the exterior part. In this way, while the hard disk drive does not operate, it is possible to effectively prevent the entry of water, etc. to the inside of the enclosure from the outside. Therefore, for example when the hard disk drive is stored in a high-humidity environment over a long period, an outstanding effect is attained in preventing the occurrence of corrosion of the magnetic disk 2 and the magnetic head 4 which are accommodated within the enclosure 1.

According to the method adopted in this embodiment, since the breather hole 6 is opened when the hard disk drive is in operation, it is impossible to completely prevent the entry of water, etc. to the inside of the enclosure 1 from the outside. However, while the hard disk drive operates, the internal temperature of the enclosure 1 usually becomes higher than the environment temperature due to heat generated by the operation. In the case where the hard disk drive operates over a long period in a high-humidity environment, a partial vapor pressure of water in the inside of the enclosure 1 and that in the outside of the enclosure 1 eventually become almost equal to each other. However, since the internal temperature of the enclosure 1 is high, a saturation vapor pressure becomes high in the interior part of the enclosure, so that a relative humidity can be kept low in the interior part of the enclosure. Against corrosion of the magnetic disk 2 and the magnetic head 4 it is known that the relative humidity is dominant rather than the absolute partial vapor pressure of water. For this reason, in the structure of this embodiment wherein the breather hole 6 is opened upon turning ON of the hard disk drive and is closed upon turning OFF of the hard disk drive, there scarcely occurs any deterioration of corrosion resistance in a high humidity environment.

Thus, according to this embodiment, when the hard disk drive is not in operation, the breather hole 6 is closed to seal the enclosure 1 hermetically, while when the hard disk drive is in operation, the breather hole 6 is opened to ensure the passing of air through both inside and outside of the enclosure 1, whereby the corrosion resistance can be improved remarkably without a lowering of reliability caused by the occurrence of a pressure difference between the inside and the outside of the enclosure 1 due to a change in external temperature or in atmospheric pressure and even in a long-term storage under a high humidity environment, thus affording a highly reliable hard disk drive which is less dependent on the external environment.

In this embodiment, for maintaining the internal environment of the hard disk drive in a cleaner condition, it is preferable that a water adsorbent and a harmful gas adsorbent be provided within the enclosure 1. It is also preferable that a filter unit 8 for preventing the entry of harmful gases and particles from the outside be affixed to the opening portion of the breather hole 6. The water adsorbent, the harmful gas adsorbent, and the filter unit 8 may be provided separately, but an integral combination thereof is preferred from the standpoint of reducing the mounting space and cost.

Whether the hard disk drive should be turned ON or OFF may be judged on the basis of whether electric power is being fed to the hard disk drive. However, even when the hard disk drive is energized, there can be a case where the internal temperature of the enclosure 1 little rises as in a stand-by mode or a sleep mode. Therefore, if the supply or non-supply of electric power is used as a criterion, then in the case where the stand-by mode or sleep mode is often used, there is a fear that the corrosion resistance may be somewhat deteriorated if the hard disk drive is left standing over a long period under a high humidity condition.

Thus, as the criterion for judging whether the hard disk drive is in operation or not, it is preferable to judge whether the rotating mechanism 3 for the magnetic disk 2 is in operation or not. In a rotating state of the magnetic disk 2, a rise in internal temperature of the enclosure 1 can surely be expected, so there can be obtained a hard disk drive of a higher reliability even when placed in a high humidity environment.

The opening/closing control mechanism 7 for the breather hole 6 used in this embodiment may be of any structure insofar as it can judge whether the hard disk drive is in operation or not and can control opening and closing of the breather hole 6. It is optional whether the opening/closing control mechanism 7 is to be mounted in the inside or in the outside of the enclosure 1.

A preferred example is using a solenoid operated valve to control the opening and closing of the breather hole 6. The use of a solenoid operated valve is convenient because the same valve permits the reduction of size and can easily be mounted on a small-sized hard disk drive. In connection with the opening/closing control mechanism 7 for the breather hole 6 in this embodiment, an example of its construction is schematically shown in FIG. 2.

Figure 2A:
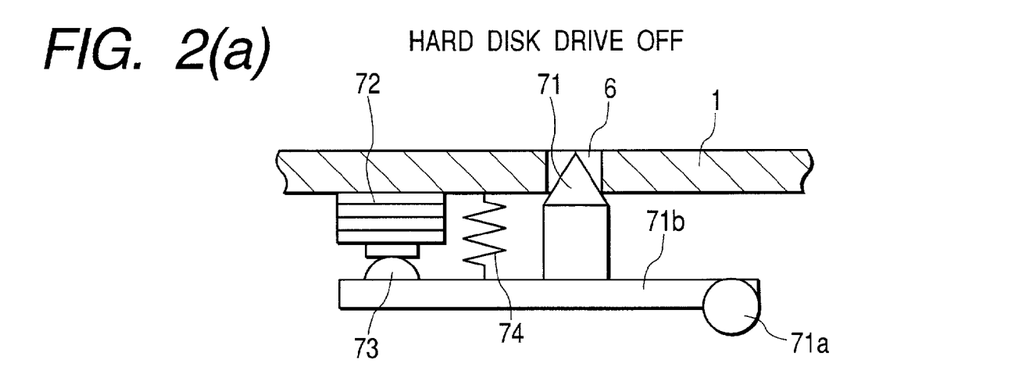
Figure 2B:
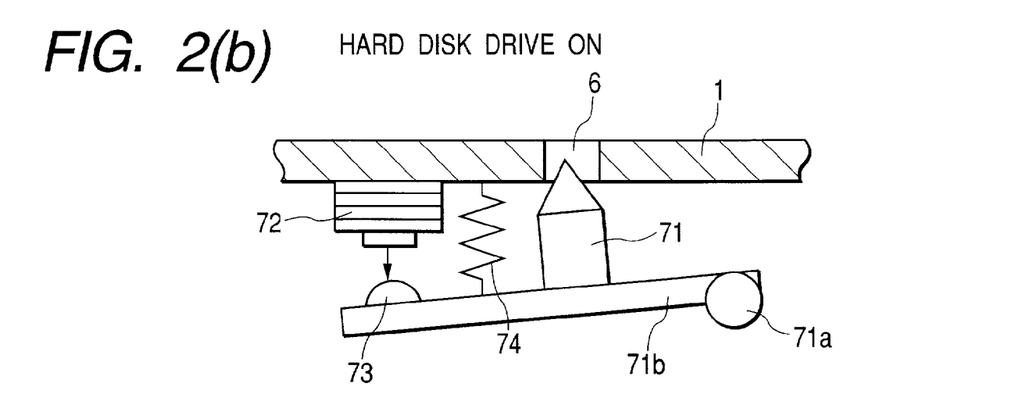

In the example shown in FIG. 2, a valve 71 is supported by a lever 71b which is adapted to pivot about a fulcrum 71a. The lever 71b is displaced by exerting a magnetic force on a magnet 73 from a solenoid 72, the magnet 73 being provided on the side opposite to the fulcrum 71a, thereby causing the valve 71 to perform an opening or closing motion for the breather hole 6.

The solenoid 72 is energized at the time of starting the operation of the hard disk drive from OFF (not in operation) state shown in FIG. 2(a), thereby inducing a repulsive force between the solenoid and the magnet 73 and lifting the valve 71, whereby the breather hole 6 is opened as in FIG. 2(b). When the hard disk drive is turned OFF, the breather hole 6 may be closed as in FIG. 2(a).

When the hard disk drive is not in operation, it is possible that the supply of electric power will also be cut off, so it is preferable that the closed state of the valve 71 be capable of being maintained without the supply of electric power. For example, in FIG. 2, the lever 71b (valve 71) is urged in the valve closing direction by a spring 74 or the like, and there may be used a solenoid operated valve wherein the valve 71 is opened by the solenoid 72 only when the hard disk drive is in operation.

In this case, even in the event the supply of electric power to the hard disk drive is cut off suddenly to turn OFF the hard disk drive, the breather hole 6 is closed automatically by the valve 71 which is compressed by the spring 74. This is effective in ensuring reliability.

In this case, however, it is necessary that the solenoid 72 be kept energized while the hard disk drive is in operation. In other words, the aforesaid structure is disadvantageous from the standpoint of reducing the power consumption of the hard disk drive.

Figure 3A:
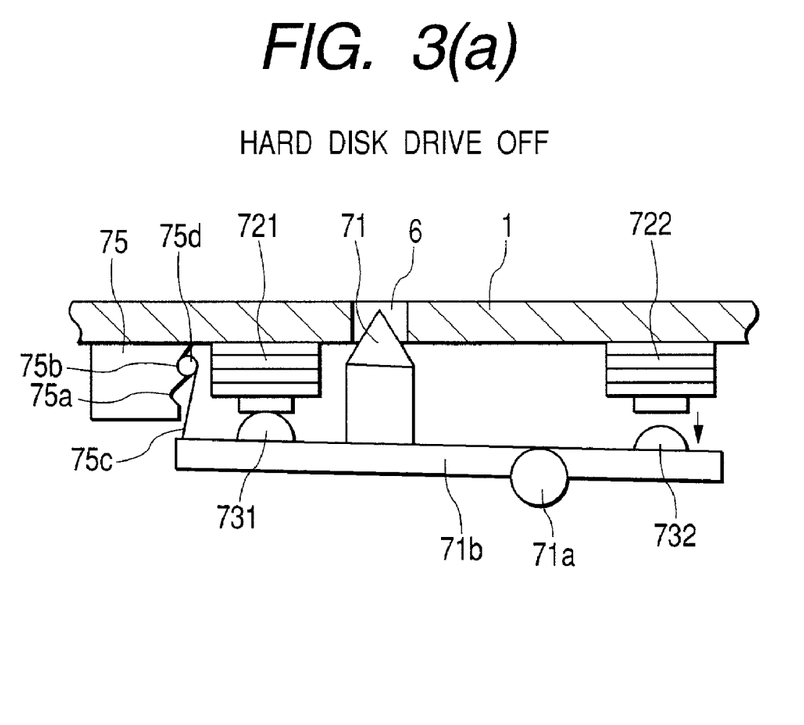
Figure 3B:
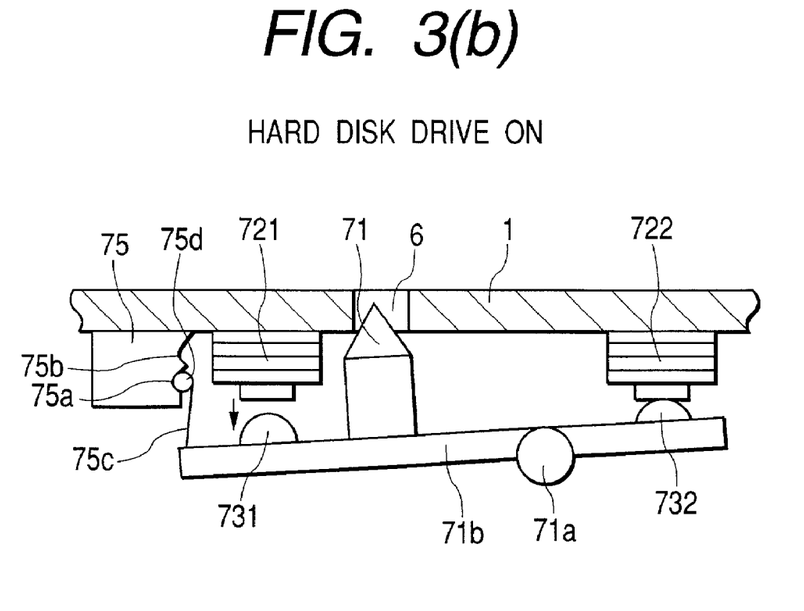

There may be used a solenoid operated valve of a toggle type having a state holding function capable of holding a state in both opening and closing directions of the valve 71 even without the supply of electric power, in which the valve 71 is moved only at the time of switching between opened and closed states. This is desirable from the standpoint of reducing the power consumption because it suffices to supply electric power only at the time of switching. Such a modified example of the opening/closing control mechanism 7 for the breather hole 6 in this embodiment is shown schematically in FIG. 3.

In the example shown in FIG. 3, a valve 71 is supported by a lever 71b which is adapted to pivot about a fulcrum 71a. The lever 71b is displaced by exerting magnetic forces on magnets 731 and 732 from solenoids 721 and 722, respectively, the magnets 731 and 732 being provided respectively at both end portions with the fulcrum 71a therebetween, thereby allowing the valve 71 to perform opening and closing motions for the breather hole 6.

On the magnet 731-mounted end side of the lever 71b is supported a retaining piece 75d through a spring 75c. The retaining piece 75d is fitted in two positions—the position of a notch 75a and the position of a notch 75b—, which notches are formed in a state holding member 75 supported on the enclosure 1 side, thereby holding open and closed positions of the valve 71 according to pivotal motions of the lever 71b.

When the retaining piece 75d shown in FIG. 3(a) shifts from an OFF state in which it is fitted in the notch 75b as a closing position to an ON state (in operation), the solenoid 721 is energized to induce a repulsive force between it and the magnet 731, thereby lifting the valve 71 to open the breather hole 6 as in FIG. 3(b). After opening of the valve 71, even if the supply of electric power to the solenoid 721 is stopped, the valve 71 is held in its open state by fitting of the retaining piece 75d in the notch 75a formed in the state holder 75.

Conversely, upon shift from the ON state of FIG. 3(b) to OFF state, the solenoid 722 is energized to induce a repulsive force between it and the magnet 732, thereby closing the valve 71 as in FIG. 3(a) to close the breather hole 6 and placing the enclosure 1 in a hermetically seated state. After closing of the valve 71, even if the supply of electric power to the solenoid 721 is stopped, the valve 71 is held in its closed state by fitting of the retaining piece 75d in the notch 75b formed in the state holder 75.

Although in this example the state holder 75 is mounted separately, since the solenoid 721 and the magnet 731 are in contact with each other in the closed state of the valve 71 and the solenoid 722 and the magnet 732 are in contact with each other in the open state of the valve 71, it is also possible to hold the respective states with magnetic forces of the magnets. In this case, the separate provision of the state holder 75 may be omitted. Although in FIG. 3 there is shown an example of using two solenoids for opening and closing the valve 71, there may be used only one solenoid to control opening and closing of the valve member 71, provided the direction of an electric current to be passed through the solenoid is switched over between control for opening and control for closing. This is preferable because the number of components used can be decreased.

In this embodiment, it is necessary to use an emergency source of power supply for surely closing the valve 71 upon sudden cut-off of the supply of electric power and turning OFF of the hard disk drive. As such an emergency source of power supply there may be used, for example, a capacitor or a battery. In the case where an operating condition of the hard disk drive is judged by confirming that the rotating mechanism 3 for the magnetic disk 2 is in operation, the magnetic disk 2 is sure to rotate as long as the valve 71 is open. Therefore, even in the event the supply of electric power is suddenly cut off, the magnetic disk 2 continues to rotate by the force of inertia. In this case, a counter electromotive force of the rotating mechanism 3 may be used as the source of power supply. This accrues a merit of cost reduction because it is not necessary to use any special power-supply source, and is thus specially desirable.

As a further preferred example of an opening/closing mechanism for the breather hole 6 there may be used a valve which operates with an air flow created by rotation of the magnetic disk. A further modified example of the opening/closing mechanism 7 for the breather hole 6 in this embodiment is schematically illustrated in FIG. 4.

Figure 4A:
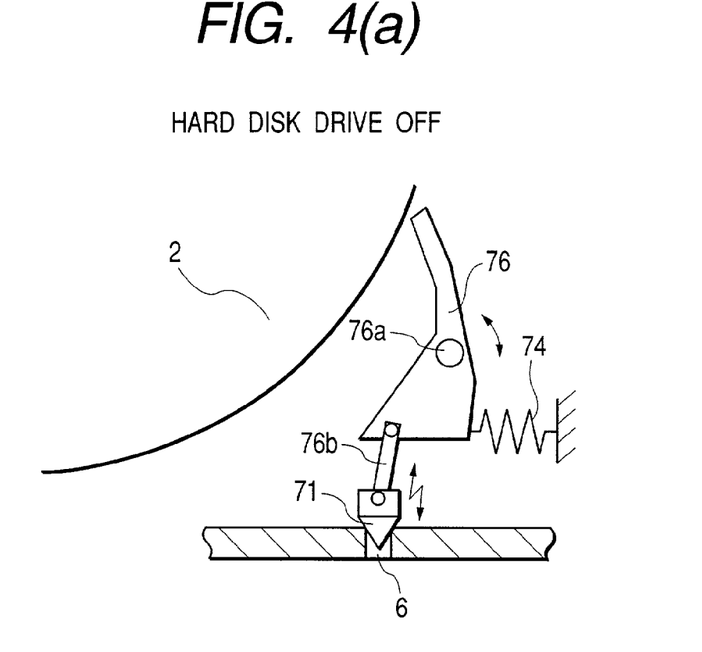
Figure 4B:
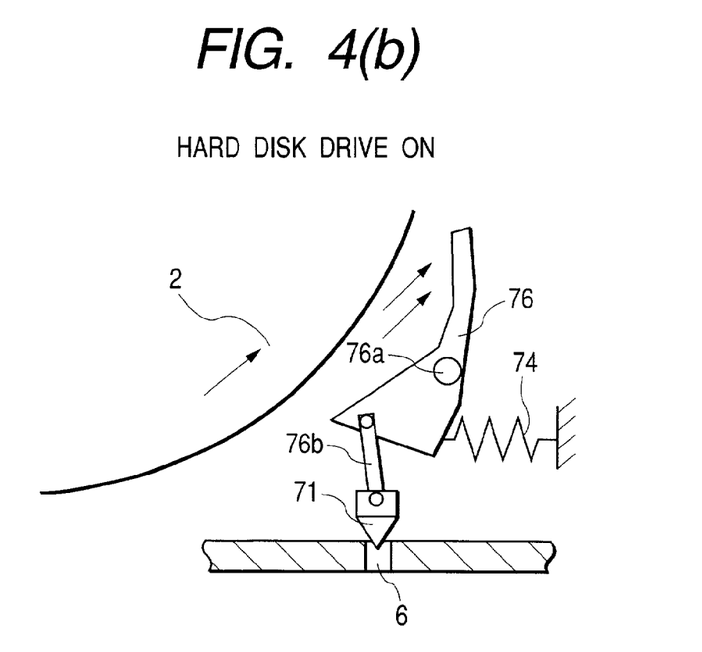

A valve 71 used in FIG. 4 is connected through a connecting arm 76b to an air receiving portion 76 which receives an air flow and generates a pivoting force about a pivot shaft 76a. While the rotation of the magnetic disk 2 is stopped, the valve 71 is urged in a closing direction by a spring 74 or the like which biases the air receiving portion 76. On the other hand, upon rotation of the magnetic disk 2, it is preferable that the valve 71 be opened against the biasing force of the spring 74 with a rotational force generated by the air receiving portion which has received the air flow. In this case, the valve 71 is opened or closed automatically in synchronism with whether the magnetic disk 2 is rotating or not, not requiring any special external electric power.

This preferable particularly from the standpoint of saving electric power required of the hard disk drive.

In this embodiment, the enclosure 1 becomes a hermetically sealed structure when the hard disk drive is not in operation. As noted earlier, while the hard drive disk is not in operation, there is little bad influence on reliability even if the pressure difference between the inside and the outside of the enclosure 1 changes due to a change in external temperature or in atmospheric pressure. However, in the event the hard disk drive should be exposed to a condition deviated markedly from the normal working temperature or atmospheric pressure, the pressure difference between the inside and the outside of the enclosure 1 will become too large and it is possible that such a force as causes a marked deformation of the enclosure 1 will act on the enclosure. In this case, there is a fear that the enclosure or a certain mechanical component may undergo a plastic deformation with consequent occurrence of a functional deterioration in structure such as a positional deviation. Further, if the pressure difference is too large, even if the breather hole 6 is opened at the time of start-up of the hard disk drive from its OFF state, the relief of pressure will not be done quickly because of a large flow path resistance if the breather hole 6 is of a small diameter, so that the magnetic disk 2 and the rotating mechanism 3 which have started rotation or the magnetic head positioning mechanism 5 which has started operation may come into contact with part of the enclosure 1 and cause a trouble.

Therefore, for ensuring a higher reliability of the hard disk drive even when there is a fear of the hard disk drive being exposed to such a severe condition, it is preferable that a safety valve (not shown) adapted to operate only upon occurrence of a marked pressure difference between the inside and the outside of the enclosure 1 be provided in the enclosure 1 to relieve the pressure difference between the inside and the outside of the enclosure 1 in case of emergency.

Figure 5:
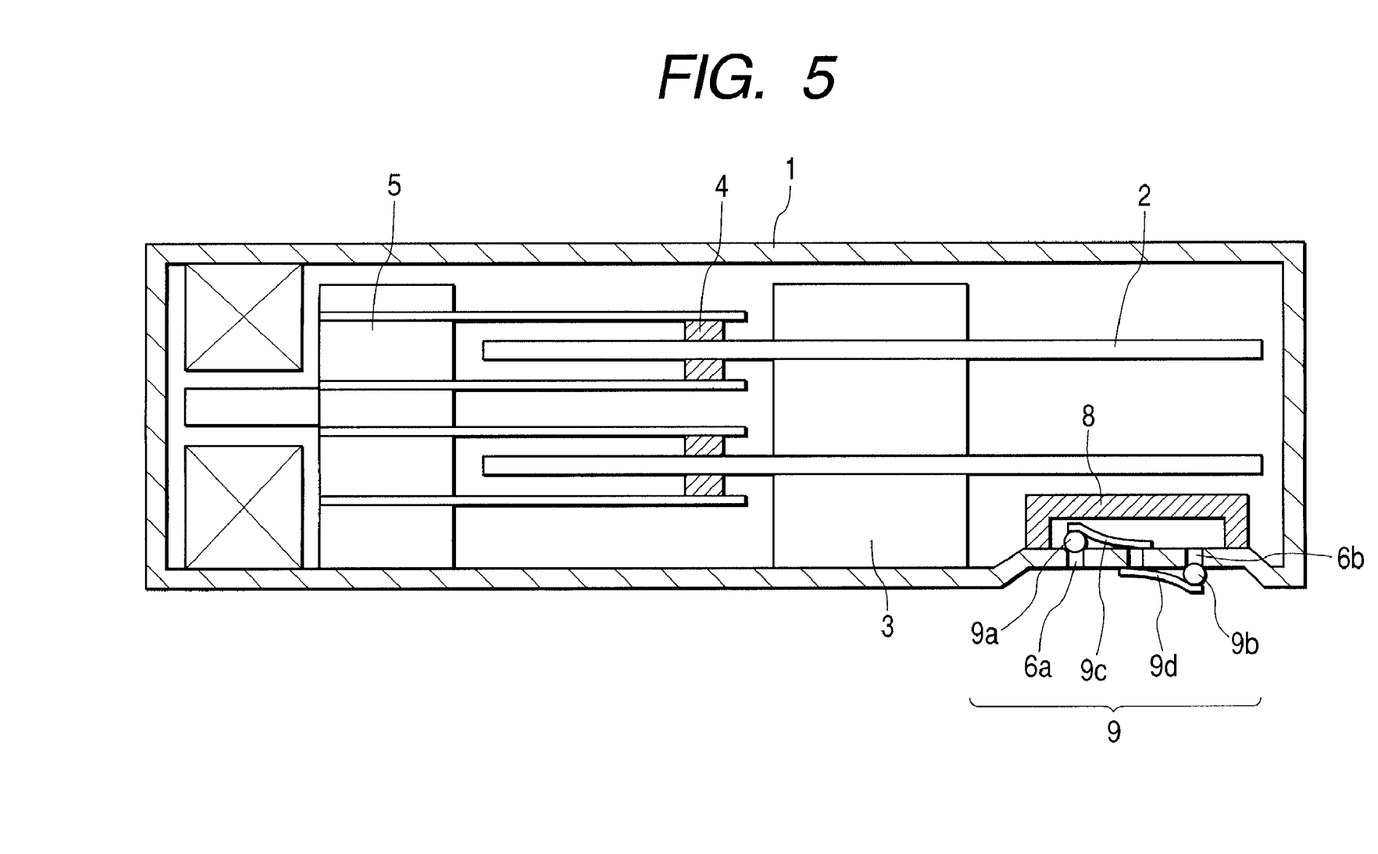
FIG. 5 is a sectional view showing an example of a breather hole closing structure.

Alternatively, from a different conception, there may be provided a closure mechanism 9 which operates to open the breather hole 6 only upon occurrence of a pressure difference between the inside and the outside of the enclosure 1. FIG. 5 shows an example of mounting the closure mechanism 9 to the hard disk drive.

In the enclosure 1 are formed two breather holes 6a and 6b as through holes communicating with the exterior. The breather holes 6a and 6b are closed with valves 9a and 9b, respectively, for opening and closing motions from the inside and outside, respectively, of the enclosure, the valves 9a and 9b being urged by plate springs 9c and 9d, respectively. The portions where the breather holes 6a and 6b are formed are covered with a filter unit 8, the filter unit 8 functioning to remove moisture contained in air, gases and particles flowing into the enclosure 1 from the exterior through the breather holes 6a and 6b.

The value of spring coefficient (strong or weak) of the plate springs 9c and 9d for urging the valves 9a and 9b is set appropriately according to the magnitude of a threshold value, which differs depending on the rigidity of the enclosure 1, etc., of a pressure difference between the interior and the exterior of the enclosure to be relieved by opening the breather holes 6a and 6b.

When the internal pressure of the enclosure 1 becomes higher than the atmospheric pressure in the outside for some reason (e.g., the generation of heat in the interior of the enclosure 1 with operation of the hard disk drive or a decrease of the external atmospheric pressure during storage of the hard disk drive) and if the pressure difference exceeds a threshold value which is determined by the spring coefficient of the plate spring 9d, the valve 9b is pushed back to the outside due to the pressure difference to open the breather hole 6b, so that an air flow is created from the inside of the enclosure 1 to the outside. When the pressure difference is relieved, the valve 9b returns to its original closed position.

Conversely, when the internal pressure of the enclosure 1 becomes lower than the external atmospheric pressure for some reason (e.g., cooling of the interior of the enclosure upon turning OFF of the hard disk drive or an increase of the external atmospheric pressure during storage of the hard disk drive) and if the pressure difference exceeds a threshold value which is determined by the spring coefficient of the plate spring 9c, the valve 9a is pushed back to the inside due to the pressure difference to open the breather hole 6a, so that an air flow is created from the outside of the enclosure 1 to the interior. When the pressure difference is relieved, the valve 9a returns to its original closed state. At this time, moisture, gases and particles contained in the incoming air flow are captured by the filter unit 8.

Thus, the closure mechanism 9 illustrated in FIG. 5 closes the breather holes 6a and 6b as far as possible irrespective of whether the hard disk drive is in operation or not and opens the breather holes 6a and 6b appropriately so as to relieve such a pressure difference as causes a more marked deformation than allowed of the enclosure 1 in the interior part and exterior part of the enclosure 1. Therefore, it becomes possible to attain both the prevention of entry of moisture, gases and particles from the exterior by hermetic seal of the enclosure 1 and the prevention of deformation of the enclosure 1 by relief of the pressure difference between the inside and outside of the enclosure 1. Besides, since the opening motion of the closure mechanism 9 is performed automatically by the pressure difference itself, there accrues an advantage that any complicated construction and power are not needed.

Figure 6:
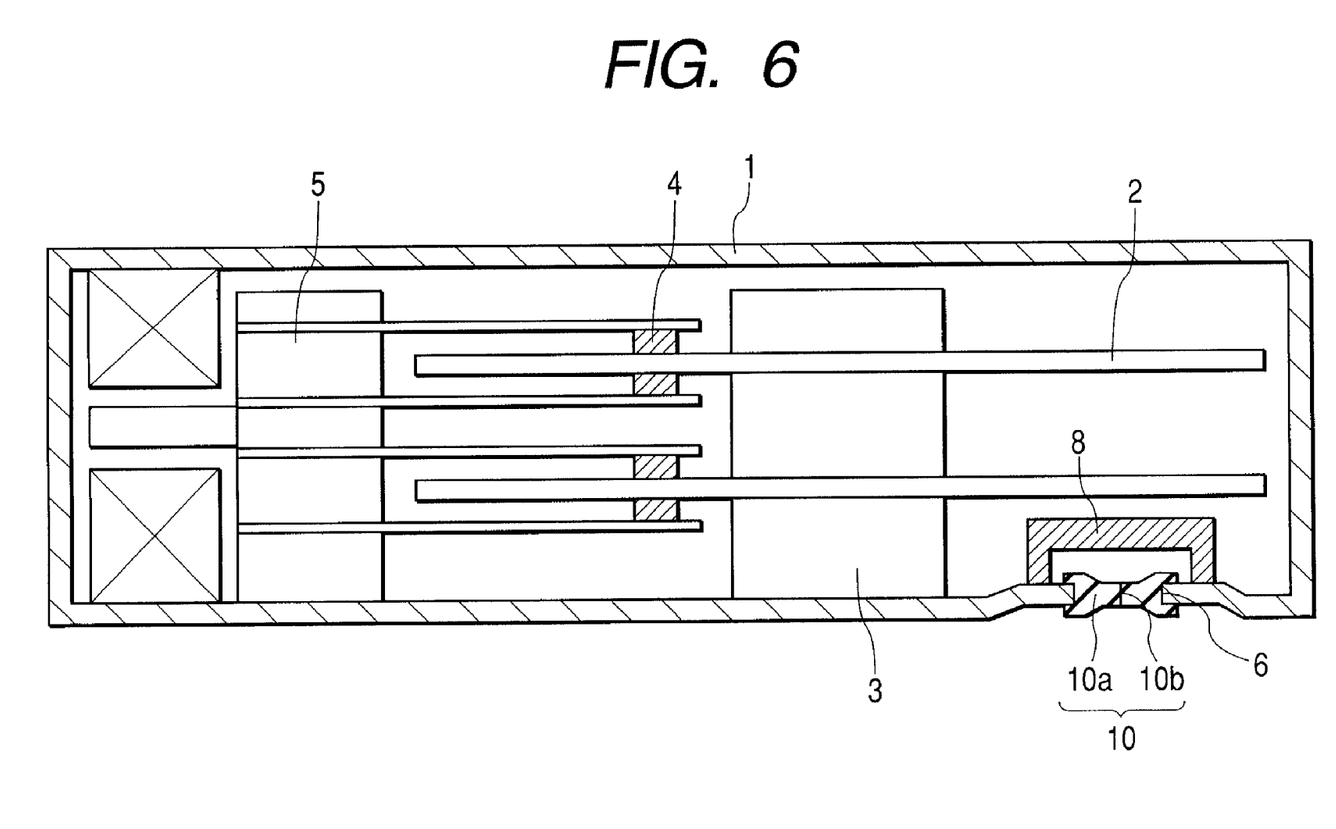
FIG. 6 is a sectional view showing a modified example of a breather hole closing structure.

FIG. 6 shows an example of mounting a closure mechanism 10 to the hard disk drive, which closure mechanism is based on an idea similar to that illustrated in FIG. 5.

In the example of FIG. 6, a bushing 10a formed of an elastic material such as rubber is used as a closure mechanism 10 and is fitted in a breather hole 6 formed in an enclosure 1 of the hard disk drive. Centrally of the bushing 10a is formed a slit 10b so as to extend through the bushing 10a in the thickness direction. The slit 10b is kept closed by an elastic deformation caused by, for example, a mounting pressure of the bushing 10a against the breather hole 6. When the pressure difference between the inside and the outside of the enclosure 1 exceeds a threshold value capable of being set to an appropriate value on the basis of an elastic modulus and thickness of the bushing 10a, the slit 10b is expanded due to a deformation caused by such pressure difference, so that the breather hole 6 is opened and functions to relieve the pressure difference.

More specifically, when the internal pressure of the enclosure 1 becomes higher than the external atmospheric pressure and the pressure difference between the inside and the outside of the enclosure 1 exceeds the threshold value for some reason (e.g., the generation of heat in the interior of the enclosure 1 with operation of the hard disk drive or a decrease of the external atmospheric pressure during storage of the hard disk drive), the bushing 10a is deformed in such a manner as expands to the outside due to the pressure difference, whereby the slit 10b is expanded and the breather hole 6 is opened, allowing air to flow out from the inside of the enclosure 1 to the outside through the breather hole 6 (slit 10b).

When the pressure difference is thus relieved, the slit 10b returns to its original contracted state.

Conversely, when the internal pressure of the enclosure 1 becomes lower than the external atmospheric pressure and the pressure difference exceeds a threshold value based on, for example, physical properties of the bushing 10a for some reason (e.g., cooling of the interior of the enclosure 1 upon turning OFF of the hard disk drive or an increase of the external atmospheric pressure during storage of the hard disk drive), the bushing 10a is deformed in such a manner as expands to the inside due to the pressure difference, whereby the slit 10b is expanded and the breather hole 6 is opened, allowing air to flow from the outside to the inside of the enclosure 1 through the breather hole 6 (slit 10b). When the pressure difference is relieved, the slit 10b reverts to its original contracted state. At this time, moisture, gases and particles contained in the incoming air flow are captured by the filter unit 8.

In the closure mechanism 10 illustrated in FIG. 6, the breather hole 6 is closed as far as possible irrespective of whether the hard disk drive is in operation or not, and the breather hole 6 is opened appropriately to relieve such a pressure difference as causes a deformation of the enclosure 1 to a greater extent than allowed in the interior part and exterior part of the enclosure 1, so that it is possible to attain both the prevention of entry of moisture, gases and particles from the outside by hermetic seal of the enclosure 1 and the prevention of deformation of the enclosure 1 by relief of the pressure difference between the inside and outside of the enclosure 1. Besides, since the opening motion of the closure mechanism 10 is performed automatically by the pressure difference itself, there is a merit that neither a complicated construction nor power is required. Further, in the case of the closure mechanism 10 shown in FIG. 6 there is an advantage that with a single breather hole 6 there can be attained the same function in a simpler manner as compared with the closure mechanism 9 shown in FIG. 5.

Figure 7:
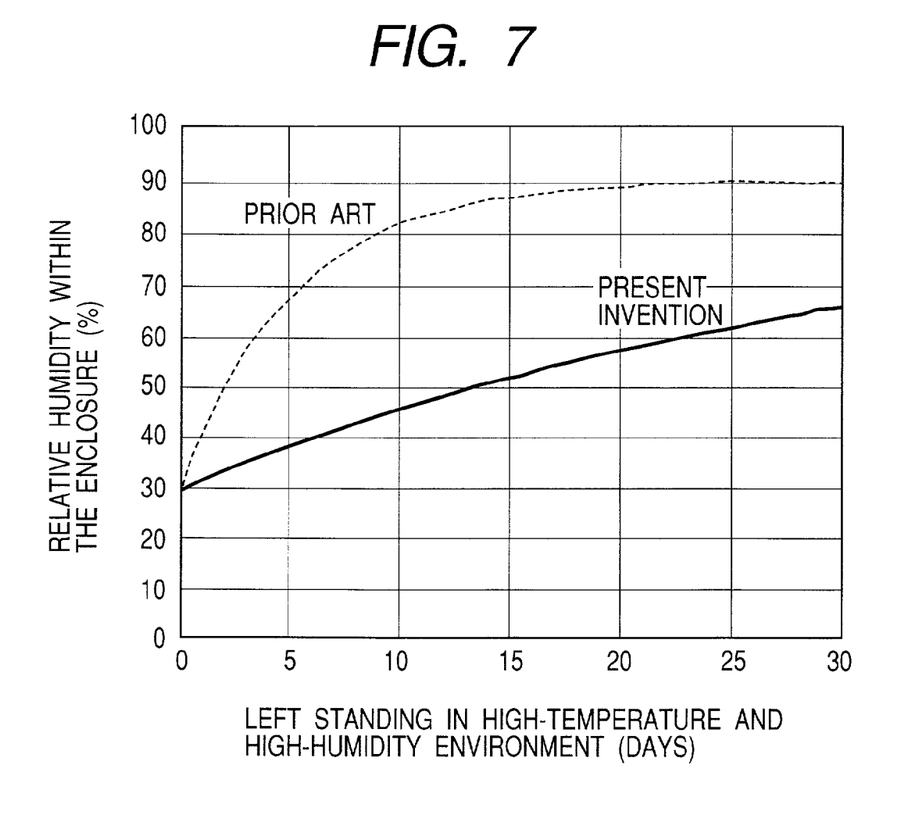
FIG. 7 is a graph showing function and effect in comparison with a conventional hard disk drive.

FIG. 7 shows the results of having measured changes in relative humidity in the interior part of enclosure with respect to the hard disk drive embodying the invention and described above and a conventional ordinary type of a hard disk drive having breather holes. In this measurement, both hard disk drives were left standing over a long period under such high temperature and high humidity conditions as temperature 60° C. and humidity 90%.

In this measurement, a small-sized humidity sensor is installed within the enclosure 1 of each head disk drive to directly measure a change in relative humidity in the interior part of the enclosure. In the conventional hard disk drive, a relative humidity in the interior part of the enclosure 1 reached 80% after left standing for 10 days. After left standing for 30 days, the conventional hard disk drive was disassembled and the magnetic disk 2 and the magnetic head 4 were checked to find that the magnetic head was partially corroded. On the other hand, in the hard disk drive according to the present invention, an internal humidity of the enclosure 1 was not more than 50% even after left standing for 10 days, and no corrosion was recognized in the magnetic disk 2 and the magnetic head 4 even after left standing for 30 days. Thus, the hard disk drive according to the present invention proved to be highly resistive to environment.

Although the invention accomplished by the present inventor has been described above concretely by way of embodiments, it goes without saying that the present invention is not limited to the above embodiments and that various changes may be made within the scope not departing from the gist of the invention.

According to the present invention, an opening/closing controller is provided in a breather hole formed in the enclosure of the hard disk drive to close the breather hole when the hard disk drive is not in operation and open the breather hole only in an operating condition of the hard disk drive in which the internal temperature of the enclosure rises, thereby affording a hard disk drive which is highly reliable even when subjected to an environmental change, especially even during storage under a high humidity condition over a long period.

Further, according to the present invention, a closure means is provided in a breather hole formed in the enclosure of the hard disk drive and the breather hole is opened only upon occurrence of a pressure difference between the inside and the outside of the enclosure to relieve the pressure difference into a predetermined allowable value or less, thereby affording a head disk drive which is highly reliable even against an environmental change, especially even during a long-term storage under a high humidity condition.

What is claimed is:

1. A hard disk drive comprising:
   a medium recording information;
   a head reading and writing of information with respect to said medium;
   a mechanism positioning said head on said medium;
   an enclosure housing these components therein;
   a hole formed in said enclosure passing air between the interior and the exterior of said enclosure;
   a solenoid operated valve capable of maintaining an open state or a closed state without electrical power being supplied thereto; and
   a controller controlling opening and closing of said hole in accordance with an operating condition of said medium by supplying electric power to said solenoid operated valve for switching between said open state and said closed state, wherein said open state and said closed state correspond to opening and closing of said hole, respectively.

2. A hard disk drive according to claim 1, wherein said controller supplies power to said solenoid operated valve for switching from a closed state to an open state when said mechanism rotates said medium, and wherein said controller supplies power generated from counter electromotive force to said solenoid operated valve for switching from an open state to a closed state when said mechanism stops rotating said medium.

3. A hard disk drive according to claim 1, further comprising a mechanism rotating said medium, wherein said controller closes said hole when said medium stops rotation.

4. A hard disk drive according to claim 1, wherein said controller opens said hole when the hard disk drive is supplied with electric power.

5. A hard disk drive according to claim 1, further comprising a mechanism rotating said medium, wherein said controller opens said hole upon rotation of said medium.

6. A hard disk drive according to claim 2, wherein said controller opens said hole when the hard disk drive is supplied with electric power.

7. A hard disk drive according to claim 3, wherein said controller opens said hole when the hard disk drive is supplied with electric power.

8. A hard disk drive according to claim 2, further comprising a mechanism rotating said medium, wherein said controller opens said hole upon rotation of said medium.

9. A hard disk drive according to claim 3, further comprising mechanism rotating said medium, wherein said controller opens said hole upon rotation of said medium.

10. A hard disk drive comprising:
    means for recording information;
    means for read and write of information with respect to said recording means;
    means positioning said means for read and write on said recording means;
    means for housing these means therein;
    means for passing air between the inside and outside of said housing means; and
    means for controlling a solenoid operated valve to open and close said passing means in accordance with an operating condition of said recording means;
    wherein said solenoid operated valve is capable of maintaining an open state or a closed state without electrical power being supplied thereto.

11. A hard disk drive according to claim 10, further comprising:
    means for rotating said recording means, wherein
    said controlling means closes said passing means when said recording means stops its rotation.

12. A hard disk drive according to claim 10, further comprising:
    means for rotating said recording means, wherein
    said controlling means opens said passing means when said recording means begins rotating.

13. A hard disk drive according to claim 10, further comprising:
    means for rotating said recording means; and
    wherein said means for controlling operates by counter electromotive force generated by rotation of said rotating means, when electric power to the hard disk drive is cut off.

* * * * *